United States Patent [19]
Rockwell

[11] 3,885,909
[45] May 27, 1975

[54] COMPRESSION MOLDING APPARATUS

[75] Inventor: Bruce C. Rockwell, Fort Wayne, Ind.

[73] Assignee: Dana Corporation, Toledo, Ohio

[22] Filed: Aug. 1, 1974

[21] Appl. No.: 494,261

Related U.S. Application Data
[62] Division of Ser. No. 388,012, Aug. 13, 1973, Pat. No. 3,844,701.

[52] U.S. Cl. ............................ 432/122; 432/124
[51] Int. Cl. ............................................ F27b 9/14
[58] Field of Search ............ 432/121, 122, 124, 11

[56] References Cited
UNITED STATES PATENTS
3,822,980  7/1974  Graeper ............................ 432/124
3,843,316  10/1974  Amberg et al. ..................... 432/124

Primary Examiner—John J. Camby
Attorney, Agent, or Firm—Robert E. Pollock

[57] ABSTRACT

A method and apparatus for compression molding articles of elastomeric material is disclosed. Each article is molded in a separate, portable mold which is sequentially conveyed to stations which perform the process steps of: (1) preparing, (2) loading the open mold, (3) partially closing the mold, (4) completely closing and locking the mold under pressure, (5) heating the mold to cure the elastomeric material, (6) unlocking the mold, and (7) opening the mold, stripping out the article and locking the mold open for step number (1).

5 Claims, 17 Drawing Figures

COMPRESSION MOLDING APPARATUS

This is a division, of application Ser. No. 388,012, filed on Aug. 13, 1973, now U.S. Pat. No. 3,844,701.

SUMMARY OF THE INVENTION

This invention relates generally to a method and apparatus for compression molding articles of elastomeric material, and more particularly to molding elastomeric rotary shaft seals.

The accepted practice in compression molding of the type with which this invention is concerned is to place what is commonly known as a "prep" (i.e., a preformed piece of elastomeric material which in the case of shaft seals is a ring of synthetic rubber) between the halves of a heated mold which are mounted in a press. The mold halves are closed (or pre-closed and then closed) to mold the part, with the elastomeric material flowing under pressure and heat of the mold. The mold remains closed until the material is cured.

The accepted and common method of compression molding has several serious disadvantages from the standpoint of economics. First, the press which supplies the pressure and heat to the mold is tied during the entire molding cycle from loading to unloading and including the time involved in curing. To better utilize press time, the economics dictate that the mold be multi-cavity molds, capable of molding a number of articles (e.g., 24) at one time. The cost of tooling multi-cavity molds, however, limits this solution to items produced in large quantities which permit amortization of mold costs. Also this solution limits flexibility in scheduling production. In commercial practice a compromise between single and multiple cavity molds is necessary.

Other disadvantages of current compression molding techniques and apparatus, again economically related, is poor utilization of operator time and lack of susceptibility to automation. The time required to load a multiple cavity mold and the non-productive time spent in waiting for completion of the curing of the molded article, together with the time spent in unloading and stripping a multiple cavity mold result in a relatively low output per man hour. The same is true of single cavity molds in presses and the assignment of several machines with single or multiple cavity molds to one operator. Because of their construction, automation of the loading and unloading of multiple cavity molds is not technically feasible. Further, the automation of these steps in respect of single cavity molds is not economically feasible.

A primary object of this invention is to provide a method and apparatus for compression molding articles of elastomeric material at high production rates in respect of both long run (high volume) and short run (low volume) items.

A second object of this invention is to provide a method and apparatus for compression mold which permits complete utilization of operator time and eliminates a number of manual steps customarily performed by a machine operator.

A further object of this invention is to provide a method and apparatus for compression molding which gives better process control over the molding steps and which permits complete automation of the molding process.

A still further object of this invention is to provide a method and apparatus for compression molding a number of different articles at the same time, at high production rates, with tooling costs proportional to the desired volume of the article in question.

A further object of this invention is to provide a mold carrier which is adaptable to a multiplicity of mold sizes and types which can be molded and cured in the apparatus of the invention.

The invention contemplates the use of a mold carrier which functions as an individual, portable molding station, with all the steps of the compression molding cycle being performed as the mold carrier is conveyed through the process and apparatus. The mold carrier maintains the molded article under heat and pressure without the use or necessity of a heated press. The mold carrier is sequentially transported, first on the circumference of a circular driven preparation table, then on a first walking beam transporter, onto a circular driven curing table within a curing oven, and from the curing oven by a second walking beam transporter, back onto the driven preparation table. As the mold carrier is thus transported it passes through (1) preparation stations to (2) a loading station to (3) a closing station to (4) a pre-press station to (5) a press station when the mold is clamped and locked under sufficient pressure to effect compression molding of the blank to (6) curing stations in the oven, to (7) an unlocking station, and to (8) a molded part removal station. The first and second walking beam transporters, the preparation table and the circular curing table are driven by a common drive unit to assure cooperative interaction of the transporting elements.

DESCRIPTION OF THE PREFERRED EMBODIMENT

Figure 1:
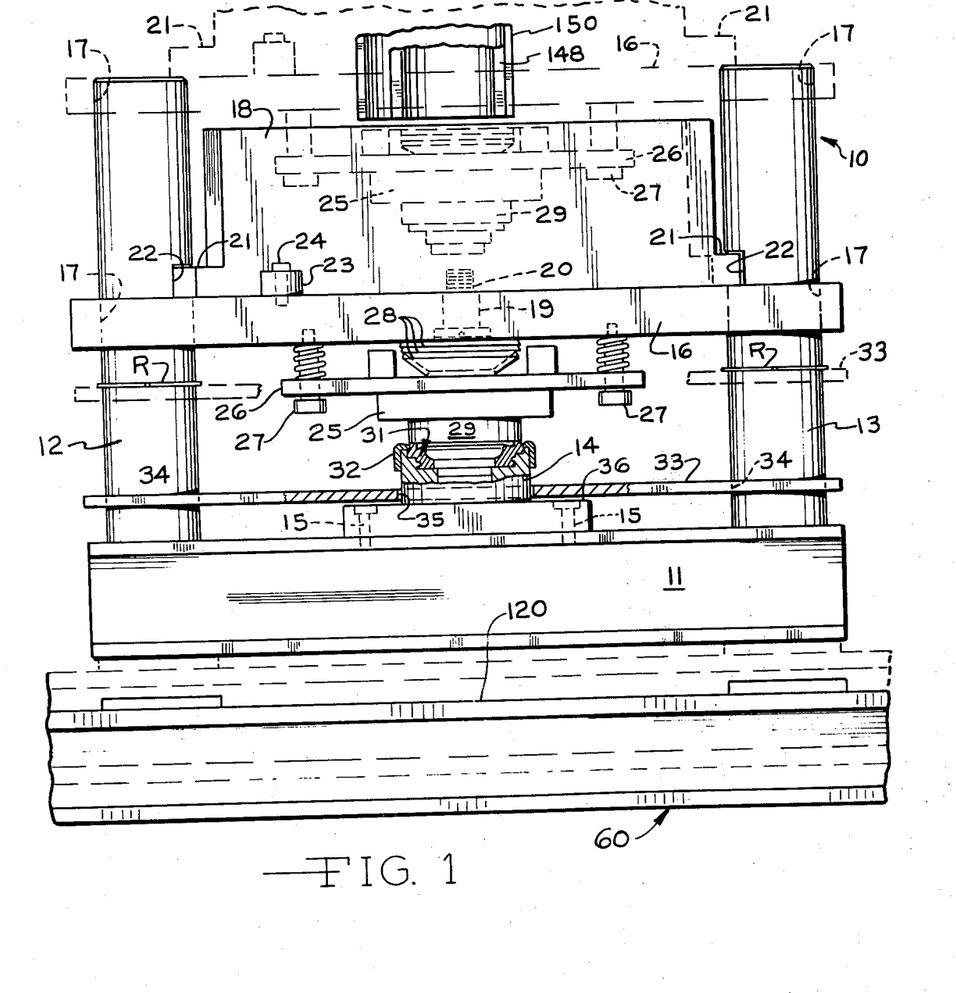
FIG. 1 is an elevational view of a mold carrier comprising the present invention.

Referring to FIG. 1, a mold carrier 10 of the present invention is shown. The mold carrier 10 comprises a base 11 having secured thereto in spaced-apart relationship a pair of upstanding guide pins 12 and 13. A portion 14 of a mold (e.g. a mold for a rotary shaft seal) is secured by fasteners 15 to the base 11, equally spaced between the guide pins 12 and 13.

A top carrier plate or platen 16 is positioned above the base 11 and is received and guided by the guide pins 12 and 13 through bores 17. The platen 16 freely slides up and down the guide pins 12 and 13. A lock bar 18, secured to the top surface of the carrier plate 16 by means of a pivot 19, has a bearing surface 20 that permits the lock bar 18 to pivot relative to the platen 16. The lock bar 18 has a pair of oppositely spaced shoulders 21 that extend into notches 22 formed in the guide pins 12 and 13. Thus, when the platen is in its lowermost position (as will be more fully described hereinafter) and the lock bar 18 aligned so its longitudinal axis intersects the axis of the two guide pins, the shoulders 21 will interlock with the notches 22 to prevent upward movement of the platen 16. On opening, pivotal movement of the lock bar 18 away from the guide pins is restrained by a stop 23 secured to the platen.

A cup-shaped member 25 is secured to the lower surface of the platen 16 for limited axial movement with respect to the platen by means of a retaining plate 26. The retaining plate 26 is secured to the platen 16 by fasteners 27. One or more (three are shown in FIG. 1) spring washers 28 are contained within the cup-shaped member. When the cup-shaped member 25 is axially spaced from the platen 16 its maximum distance from these spring washers impose no spring load, when mold is closed and the cup-shaped member 25 urged toward the platen the spring washers 28 flatten and impose the required molding pressure. Ideally, the cup-shaped member never touches the platen 16.

A male portion 29 of the mold is secured to the cup-shaped member 25 and together with the female portion 14 defines the molding cavity 31 which in this example is that of a rotary shaft seal. The metal case 32 of a rotary shaft seal is positioned over the top of the female position 14 of the mold. A stripper plate 33 having guide pin receiving holes 34 and a central hole 35 that closely surrounds the female portion 14 of the mold, rests on a shoulder 36 of the female portion 14 of the mold. The central hole 35 of the stripper plate is smaller in diameter than the metal case 32 so that upward movement of the stripper plate 33 at the end of the molding cycle will remove or strip the molded rotary shaft seal from the mold. Abutment rings R on the guide pins 12 and 13 limit the uppermost travel of the stripper plate 33 as will be explained below.

Figure 4:
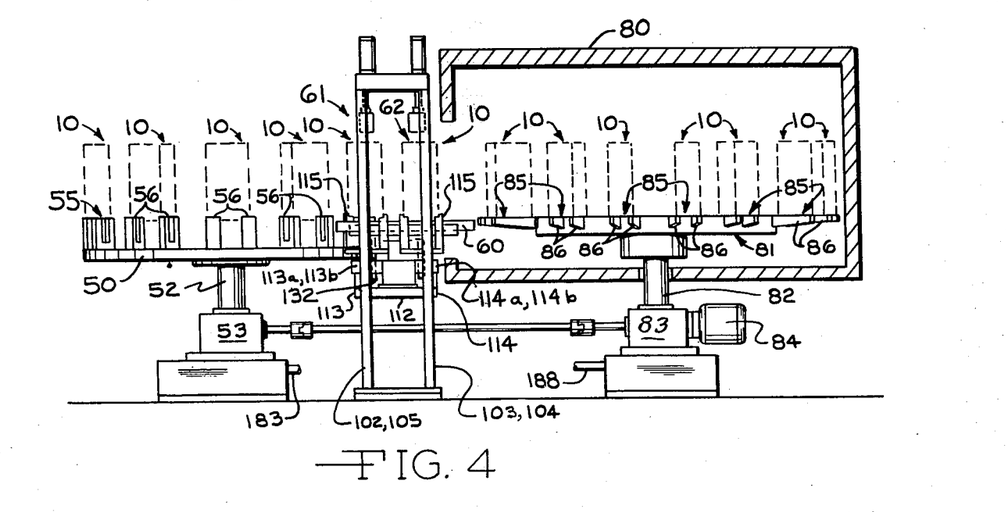
FIG. 4 is a partially diagrammatic view of the drive train comprising the present invention.
Figure 5:
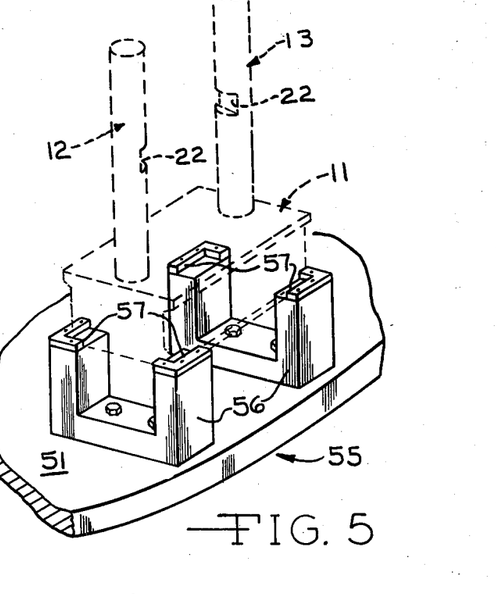
FIG. 5 is a perspective view of a support for the mold carrier shown in FIG. 1.
Figure 6:
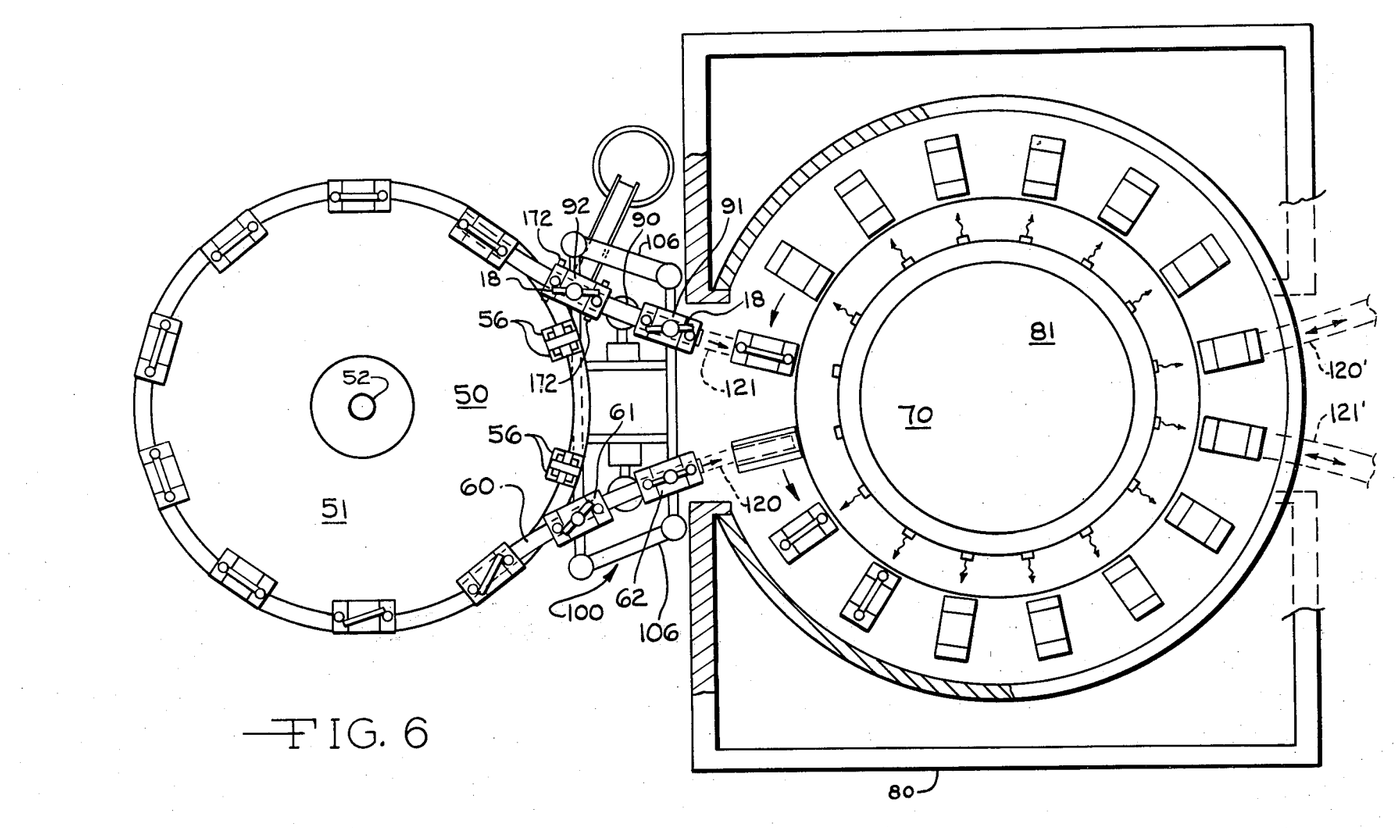
FIG. 6 is a top plan view of the molding machine of the present invention.

Referring to FIGS. 4, 5 and 6, the mold carriers 10 are shown in position on a preparation table 50 which indexes counterclockwise. From the table 50, the mold carriers 10 are transported by a unique walking beam 60 to first and second press stations 61 and 62 respectively, and then to a curing table 70 which indexes in a counterclockwise direction within a curing oven 80. A second walking beam 90 transports the mold carrier 10 to third and fourth press stations 91 and 92 respectively, and then back to the preparation table 50.

The preparation table 50 comprises a circular table top 51 mounted on a shaft 52 that is indexed by an indexing drive 53. The indexing drive, which is driven by a common drive line, is a type to permit controlled acceleration and deceleration in indexing. A series of 10 equally spaced stations 55 are arranged circumferentially on table top 51. Each station 55 consists of a pair of spaced-apart U-shaped blocks 56 that are secured to the table top and arranged to receive the base 11 of the mold carrier 10. A series of guides 57 are secured to the top surface of the upstanding legs of the U-shaped blocks and serve to guide the base 11 into position when it is set down (in a manner to be described) and which restrain the mold carrier against movement. (See FIG. 5) The U-shaped blocks 56 maintain the mold carrier 10 tangential to the axis of rotation of the table.

The oven 80 is preferably a gas fired radiant energy oven having a temperature control system (not shown). A table 81 is positioned within the oven and is mounted on a shaft 82 suitably journaled and driven by the indexing drive 83. The drive 83 is driven by a motor and a gear reducing element 84. The preparation table 50 and walking beams, to be described below, are also driven by the motor and gear reducing element 84 to assure that the indexing and transporting mechanisms move in synchronous relationship. The tables 50 and 81 index out of phase, i.e., when one is at rest the other is indexing. The oven indexing drive 83 is preferably of the type to provide controlled acceleration and deceleration during indexing.

A series of equally spaced stations 85 are arranged circumferentially on the table 81. Each station 85 comprises a pair of equally, spaced brackets 86 radially secured to the table 81. The brackets 86 maintain the mold carriers 10 in radially projected order circumferentially of and relative to the axis of rotation of the table 81.

A transport press 100 (see FIG. 6) is located intermediate the indexing tables 50 and 81 and adjacent the oven 80. Its function is to transfer (by means comprising a unique walking beam) the mold carrier 10 from the indexing table 50, pre-compress or "bump" the mold, close and lock the mold carrier 10 and deliver it to the table 81 within the oven 80. Simultaneously with the above-described operations, the transport press 100 removes a preceding mold carrier from the table 81, unlocks a mold carrier, strips a molded part from a mold and locks the mold carrier in an open position, and transfers a pre-preceding mold carrier in open and stripped condition to the indexing table 50.

Figures 7, 8, 9:
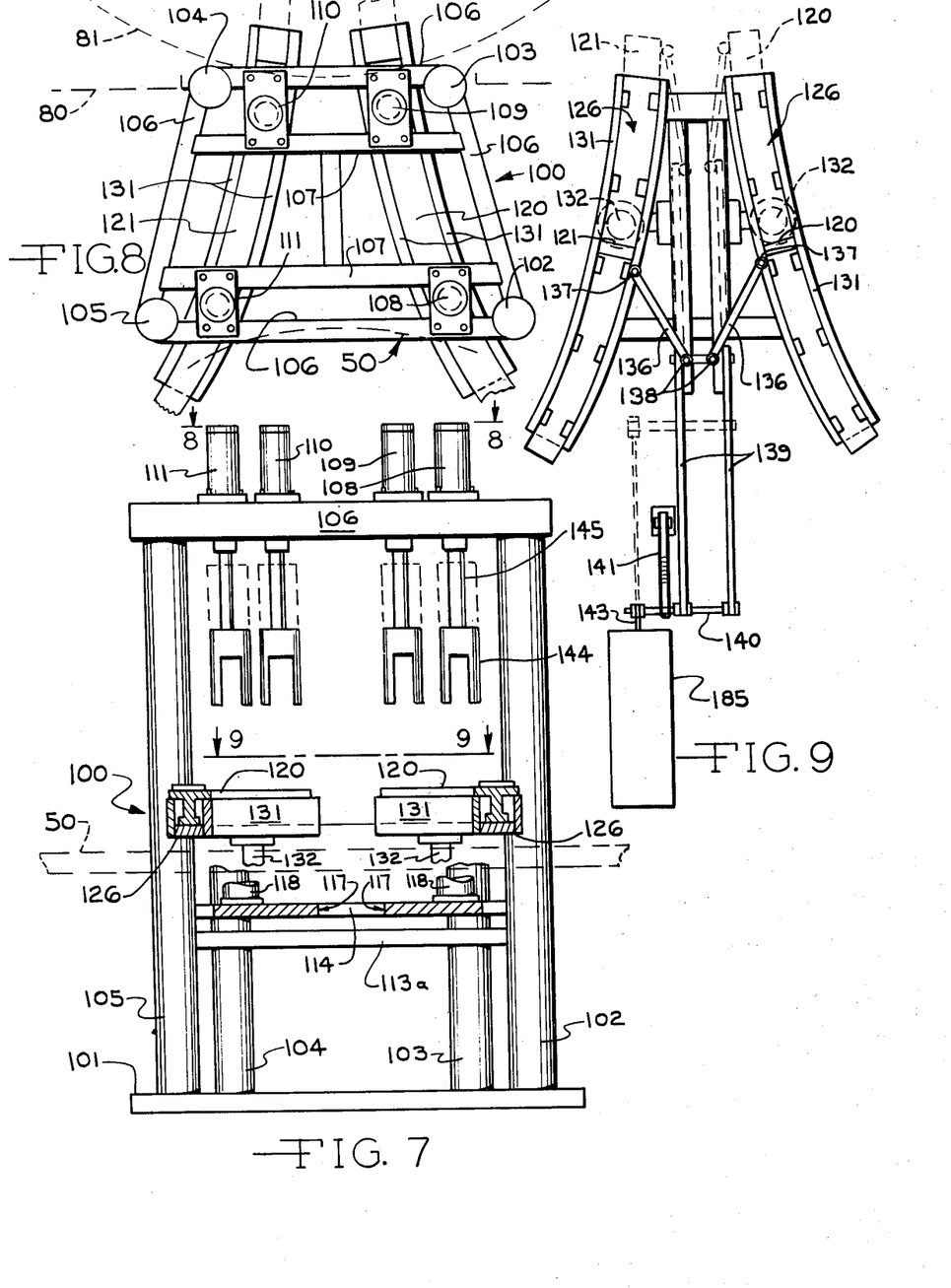
FIG. 7 is an elevational view of a transport press comprising the molding machine of the present invention.
FIG. 8 is a top view of the transport press shown in FIG. 7.
FIG. 9 is a top view of the translating mechanism comprising the present invention.

Referring to FIGS. 7, 8 and 9, the basic frame or supporting structure of the transport press 100, comprises a base 101 on which are mounted four upstanding columns 102, 103, 104 and 105, arranged so that their axes from the corners of a trapezoid (see FIG. 8, top plan view). The four columns are tied together at the top by four side braces 106 (which together define a trapezoid) and a pair of cross braces 107. Four double acting fluid cylinders 108, 109, 110 and 111 are mounted with vertical axis, between a side brace 106 and a cross brace 107.

Figures 10, 11, 12, 13, 14, 15, 16, 17:
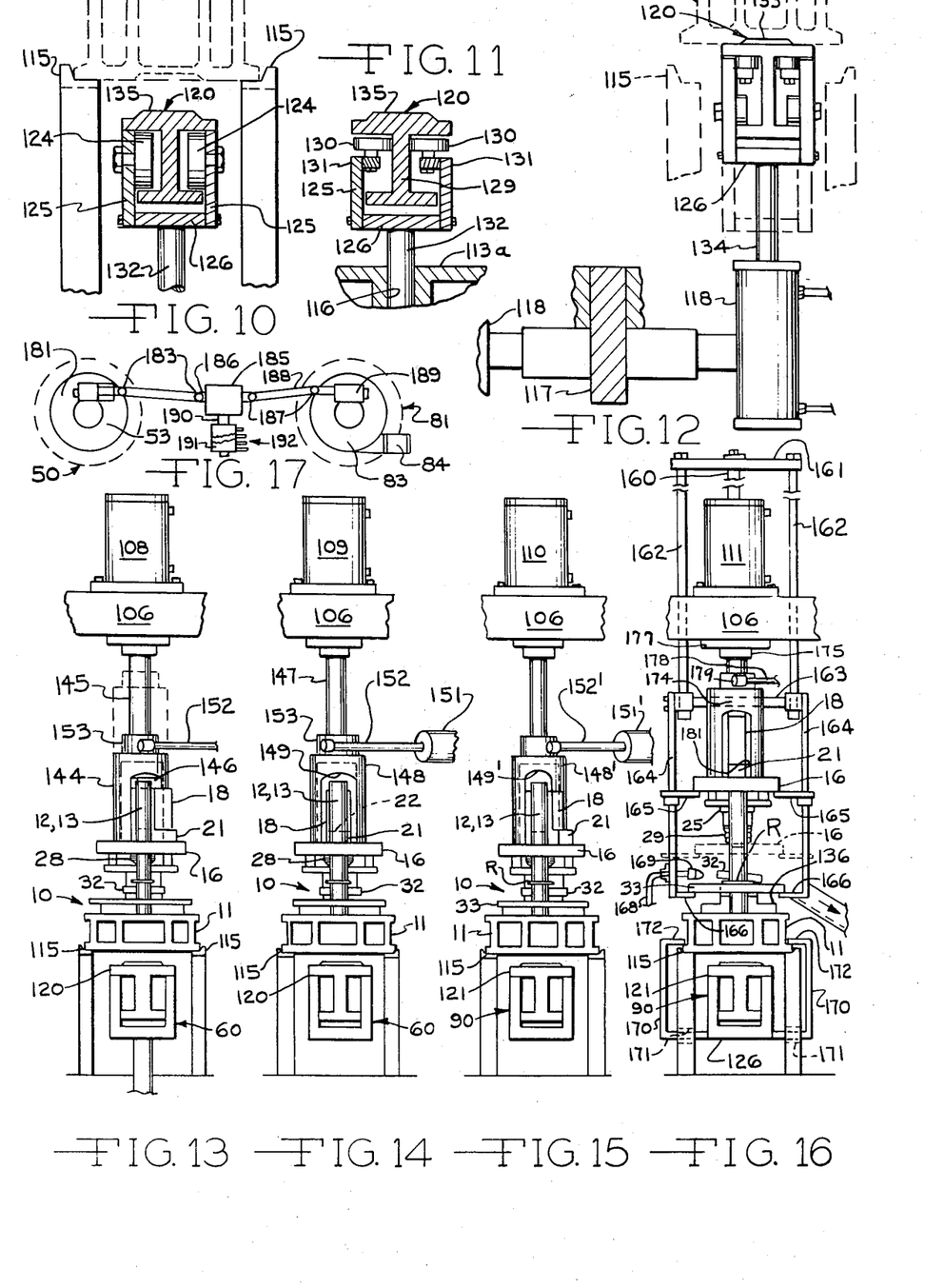
FIG. 10 is a cross-sectional view of the transport apparatus of the present invention.
FIG. 11 is a cross-sectional view of the transport means of the present invention.
FIG. 12 is a partially diagrammatic view of a lifting cylinder comprising the transport device of the present invention.
FIGS. 13 through 16 are elevational views of stations within the transport press comprising the present invention.
FIG. 17 is a diagrammatic view of the drive line of the molding apparatus of the present invention.

Referring to FIGS. 4 and 8, intermediate their ends and secured to the columns 102–105, are side braces 112, a front brace 113 and a back brace 114. The front and back brace 113 and 114 each have pairs of spaced apart, enlarged bulbular portions 113a and 113b, and 114a and 114b. A pair of mold carrier supports 115 are mounted in parallel, spaced-apart relationship on each of the bulbular portions to form 4 stations (i.e., each associated pair of mold supports forming a station). The centerline of each station (i.e., a line drawn equidistant between a pair of mold carrier supports) is tangential to the centerline of travel of the walking beams which will be described hereinafter. Referring to FIG. 11, a guide pin bore 116 is formed through the center of each bulbular portion.

A pair of cross braces 117 extend between the front brace 113 and the back brace 114. A double acting fluid cylinder 118 is mounted on each of the cross braces 117, with its axis vertical and aligned to intersect the centerline of the walking beams which will be described. The function of the fluid cylinders 118 is to raise and lower the beam carriers 126 during transfer.

Referring to FIGS. 8, 9, 10, 11 and 12 the successive transfer of each of the mold carriers 10 from the indexing table 50, from stations 1 to 2 on the transport press 100, and again from the oven 80, to stations 3 and 4 and thence to a return to the index table 50 is accomplished by means of a pair of walking beams 120 and 121 and drive mechanism associated therewith. Each walking beam is a curved, I-shaped member that reciprocates vertically and horizontally to transfer the mold carriers 10. The radius of curvature of each walking beam (which is also its centerline of travel) at one end is tangential with respect to a station on the index table 50 and at the other end is radial with respect to a station on the index table 81 of the oven 80.

Referring to FIG. 10, the walking beam 120 is supported and restrained vertically by means of a pair of opposed rollers 124 mounted on side plates 125 which are secured to a base plate 126.

Referring to FIG. 11, the walking beam 120 is positioned and restrained laterally by a pair of rollers 130 which bear against the central flange 129 of the I-shaped member. The rollers 130 are rotatably mounted, with their axes of rotation vertical, in side supports 131 which are secured to the base plate 126. Extending downwardly from the base plate 126 is a guide pin 132 which is received by the guide pin bore 116 in the bulbular portion 113a. There is a second guide pin (not shown) which is received by a guide pin bore in the bulbular portion 114a. Thus, the base plate 126 is free to move vertically up and down carrying with it the carrier beam 120. Further, the carrier beam 120 is free to move horizontally (along the curved path shown in FIG. 8) independently of the base plate 126.

Referring to FIG. 12, the base plate 126 is supported on the rod 134 of the double acting fluid cylinder 118 which is secured to the cross brace 117. The fluid cylinder 118 moves the base plate 126 and thus the I-shaped member or carrier beam 120 up and down.

The length of the carrier beam 120 is such that it spans two of the transport press stations and one additional station, either that of the indexing table or that of the oven, depending on whether it is in a forward or back position. Guides 135 are secured to the top flange of the carrier beam 120 and serve to position the mold carrier into place and restrain it against movement when it is transported by the carrier beam 120. The carrier beam 120 thus moves sequentially in upward, forward, downward and return steps and thereby lifts a mold carrier 10 up from the supports 56, forwardly on the guides 135 and down to place the carrier on the supports 115, then to proceed rearwardly beneath the mold carriers 10 to await the next cycle.

The carrier beam 121 and its supporting structure is identical to, except the mirror image of, the carrier beam 120 and its supporting structure.

Referring to FIG. 9, the carrier beams 120 and 121 are moved forward and back in unison by a pair of rods 136 which are secured at one end to the ends of the said carrier beams by universal connections 137 (i.e., a ball and socket) and are secured at their other ends, through universal connections 138 to a pair of lever arms 139. The lever arms 139 are driven by a reciprocating indexing drive 185 which controls acceleration and deceleration of the transporter beams.

In operation the rods 136 which are secured to the lever arms 139 by universal connections 138 and to the carrier beams 120 and 121 by universal connections 137, reciprocate the carrier beams simultaneously from a forward position to a back position. In the forward position the carrier beams 120 and 121 span two stations on the transport press 100 and one station on the indexing table 81 as explained above. In the back position the carrier beams 120 and 121 span two stations on the transport press 100 and one station on the preparation table 50 explained and as shown in FIG. 9.

Referring to FIGS. 9 and 12, as the carrier beams 120 and 121 are reciprocated by the rods 136 as described, the fluid cylinders 118 connected to the rod 132 adjacent the base plate 117 alternately elevate and lower the carrier beams 120 and 121 into and out of contact with the base of the mold carriers 10 which have been indexed to the stations beneath which the carrier beams 120 have spanned. For example, when the carrier beams 120 and 121 reach the back position the fluid cylinder 118 beneath the carrier beam 120, elevates that beam 120 into supporting contact with the mold carriers 10 which are on two stations of the transport press 100 and one station of the indexing table 50. The opposite carrier beam 121, also spanning stations on the transport press 100 and the indexing table, is simultaneously lowered out of contact with the mold carriers 10 on those stations. As the driven lever arms 139, drive the rods 136 connected to the carrier beams 120 and 121 to their forward position, the carrier beam 120 translates three mold carriers 10 as follows:

The forwardmost mold carrier 10 is translated from a forward station on the transport press 100 into a station on the oven table 81 as shown in FIGS. 6 and 8. The mold carrier 10 on the back station of the transport press 100 is moved to the forward station. Finally, the mold carrier 10 on the indexing table station is translated to the back station of the transport press 100.

The carrier beam 121 which is lowered out of contact with its respective mold carriers 10, and which is being simultaneously driven by the lever arms 139, passes under the stations until it reaches the forward position.

When the mold mold carrier 10 is carried out the forward position, the fluid cylinders 118 simultaneously (1) lower the carrier beam 120 out of contact with the respective mold carriers 10, depositing them in their stations and (2) raise the carrier beam 121 into contact with the respective mold carriers 10 on those respective stations.

As the carrier beams 120 and 121 are translated toward the back position, the carrier beam 121 translates three mold carriers 10 as follows:

The forwardmost carrier 10 out of the oven 80 to a forward station on the transport press 100. The intermediate mold carrier 10 is translated to a back station on the transport press 100. Finally, the mold carrier 10 on the back station of the transport press 100 is carried to a station on the preparation table 50.

The alternate and simultaneous raising and lowering of the carrier beams 120 and 121 therefore provides means for translating mold carriers 10 from the indexing table 50, through the transport press 100, into the oven table 81, thence from the oven table 81, through the transport press 100 and back onto the indexing table 50.

As is shown in FIG. 6, a second carrier beam and transport press may be installed for supplying the curing table 81 from the opposite side of the oven 80.

It can be appreciated that the motion of the indexing table 50, the carrier beams 120 and 121 and the oven table 81 must be precisely coordinated. This is accomplished by the common drive mechanism which also actuates the fluid cylinders 118. The mold carriers 10 are thereby translated to the various stations which perform the following functions:

As a mold carrier 10 is indexed around by the table 50 through the entrance side of the transport press 100, through the oven 80 and through the exit side of the transport press to return to the table 50, it passes through four stations of the transport press 100 which for convenience will be referred to as stations Nos. 1, 2, 3 and 4 in order of their respective operations on a mold carrier 10.

Referring to FIG. 13 which is an elevational view at station No. 1, the function of this station is to preclose the mold to nearly its final closed position. In compression molding this is a conventional process step, known as "bumping" and is intended to initiate molding while allowing the escape of gases. As here shown a mold carrier 10 is in position on the pair of supports 115 arranged alongside the walking beams, where it has been placed by the carrier beam 120. Positioned above the station, and in central alignment therewith is the previously mentioned cylinder 108 which is secured to the top portion of the transport press. A straddle block 144 is rigidly secured to the rod 145 of the fluid cylinder 108. The straddle block is generally cylindrical and has an inverted U-shaped port 146 cut through its lower end. This port 146 permits the straddle block 144 to clear or permit passage of the lock bar 18 and guide pins 12 and 13 of the mold carrier 10 while permitting the straddle block to press (in its lower position) the platen to a nearly closed position. The straddle block is moved up and down, by extension or retraction of the cylinder rod 145.

Figure 2:
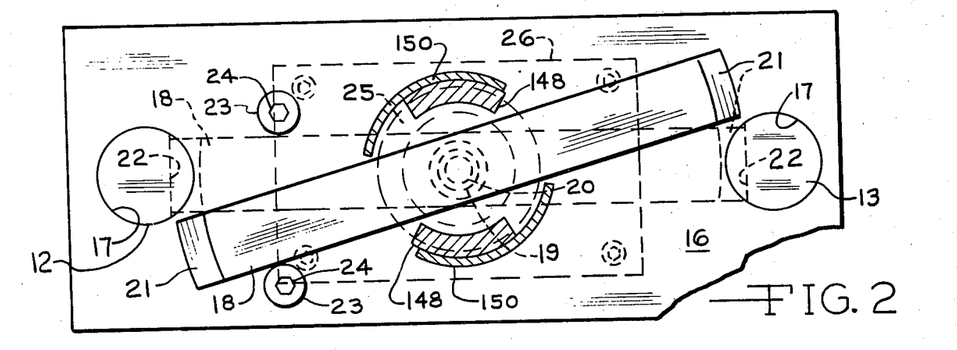
FIG. 2 is a top view of the mold carrier shown in FIG. 1.
Figure 3:
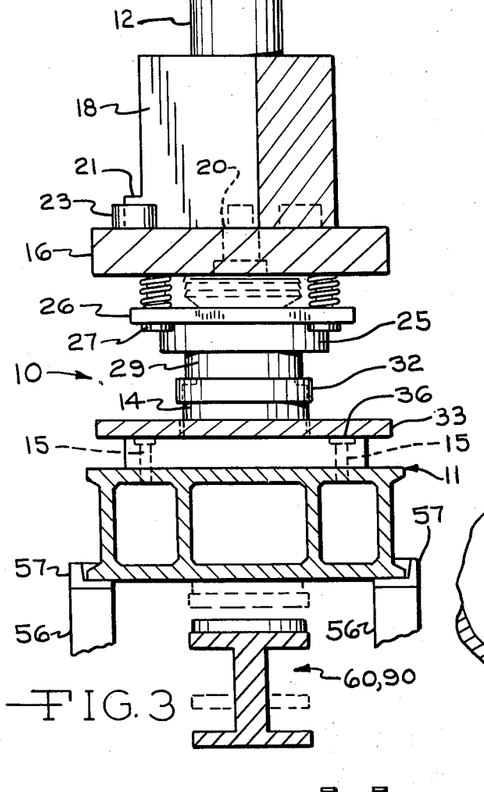
FIG. 3 is a front elevational view of the mold carrier shown in FIG. 1 with a transporting means in place therebeneath.

Referring to FIG. 14, the function of the second station (No. 2) is to press the mold closed against the pressure exerted by the spring washers 28 and to lock it in a closed position by rotating the lock bar 18 so its shoulders 21 engage the notches 22 formed in the guide pins 12 and 13. As shown, a mold carrier 10 is resting on the supports 115 above the carrier beam 120. The previously described fluid cylinder 109 is positioned directly above and in alignment with the mold carrier. A straddle block 148 is secured to the lower end of the cylinder rod 147. The straddle block is generally cylindrical and has a U-shaped port 149 designed to permit passage of the lock bar and guide pins of the mold carrier 10. A rotatable locking member 150 is rotatably secured to the cylinder rod 147 and closely surrounds the straddle block 148. The locking member has a cutout similar to the port 149 to permit passage of the mold carrier. A double-acting fluid cylinder 151 (mounted on the transport press by means not shown) has its cylinder rod 152 secured to the locking member 150 by a rotatable connection 153, whereby on extension or contraction of the rod 152, the locking member 150 will be caused to rotate to move the lock bar 18 into a locked position. (See also FIG. 2.)

The action of No. 3 station (FIG. 15) is effectually in reverse to that of station No. 2. The function and operation of the fluid cylinders 110 and 151, is to press downwardly against the platen 16 and to rotate the lock bar 18 to free it from the notches 22 in the pins 12 and 13, thus unlocking the mold, and finally to release the constrained pressure of the spring washers 28 therein.

The function of the fourth station (No. 4) FIG. 16 is to strip the molded part from the mold and to lock the platen in an "up" or open position, preparatory to receiving the next charge. The double acting cylinder 111 previously described is supplied with a piston rod 160 extending vertically upwardly. The rod 160 is secured to a cross arm 161 which has secured thereto two depending rods 162. A set of cross bars 163 is secured to each of the depending rods 162. Each of the second cross bars 163 has secured thereto a pair of depending stripper arms 164. Each stripper arm 164 has a pair of longitudinally spaced-apart, laterally extending upper and lower ledges 165 and 166, respectively. The upper ledges 165 are designed to grab the bottom of the platen 16. The lower ledges 166 are designed to grab the bottom of the stripper plate 33. When the cylinder rod 160 is retracted and the cross arm 161 is in its lowermost position, the upper and lower ledges 165 and 166 underlie the platen 16 and stripper plate 33 and permit the mold carrier to be transported to station number 4. The stripper arms 164 are raised by the rod 160 with the upper ledge 165 first engaging the platen 16 to open the mold and the lower ledge 166 next engaging the stripper plate 33 to raise it and strip the molded part from the mold. An air hose 168 and nozzle 169 are attached to one of the stripper arms 164 and direct compressed air at the stripped part to blow it from the mold into a collection bin or the like (not shown).

In order to hold down the mold carrier during the stripping operation, two pairs of C-shaped members 170 are secured to and extend laterally from each side of the base plate 126. The C-shaped members extend through elongated holes 171 in the mold carrier supports 115, upwardly and inwardly where inturned portions 172 overlie the lower flange 38 of the base 11 of the mold carrier. During transport of the mold carrier 10 by the carrier beam 121, the base plate is raised, thus placing the inturned portions 172 in spaced relationship to the upper flange 37 and lower flange 38 of the base 11 of the mold carrier and permitting free passage of the mold carrier to its positions on the supports 115.

A straddle block 174 overlies the lock bar 18 and is rotatably secured to a depending post 175 which is secured to the transport press 100 by a bracket 177. A double-acting fluid cylinder (not shown) mounted on the transport press 100 has its cylinder rod 178 secured through a universal connection 179 to the periphery of the straddle block 174. The straddle block 174 has a U-shaped port 181 which forms two depending legs of the straddle block that fall on either side of the lock bar. When the stripper arms 164 are in their uppermost position the platen is elevated to a position where the lock bar is above the tops of the guide pins 12 and 13. At this point, activation of the fluid cylinder rod 178 will rotate the straddle block to align the lock bar 18 with the guide pins, with the flange 21 of the lock bar resting atop the guide pins to hold the platen in an up position and the mold open to facilitate loading for the next molding operation.

Referring to FIG. 17, there is shown schematically the drive mechanism for timing the apparatus described herein. The electric motor 84 (FIG. 4) drives, through a suitable reduction gear, the indexing drive 83 of the oven table 81. A power take-off from the motor and gear reducer 84 connects through universal joints 187 and a propeller shaft 188 to a reciprocating index drive 185. In order to maintain synchronous action, the index drive 185 has a direct-through input shaft 186 which connects through universal joints 183 and a propeller shaft to the indexing drive 53 of the preparation table 50. A series of cam actuated valves 191 is driven through a timing belt from the main drive shaft system and controls through lines 192 in the proper sequence the cylinders described herein.

What I claim is:

1. An apparatus for compression molding articles positioned within mold carriers comprising, a first table having spaced means on its periphery to receive a plurality of mold carriers, a curing oven, a second table within said oven having spaced means on its periphery to receive a plurality of mold carriers and translating means for alternatively translating the mold carriers from said first table to said second table and from said second table to said first table, said translating means comprising a pair of arcuate members, each arcuate member having a first end radially aligned with the periphery of said second table and a second end tangentially aligned with the periphery of said first table.

2. An apparatus for compression molding articles according to claim 1, including drive mechanism for cooperatively driving said first table, said second table and said translating means.

3. An apparatus for compression molding articles according to claim 1, wherein each of said arcuate members comprises a frame member and a horizontally reciprocable carrier arm mounted for movement on said frame member.

4. An apparatus for compressing molding articles according to claim 3, including means for vertically moving each of said arcuate members.

5. An apparatus for compression molding articles according to claim 3, wherein said translating means includes a pair of drive arms driven by said drive mechanism, each of said drive arms being connected to one of said carrier arms for moving said arms horizontally between said first and second tables.

* * * * *